United States Patent [19]

Kuroiwa et al.

[11] 3,751,266

[45] Aug. 7, 1973

[54] PRODUCTION OF ISOMERIZED HOP EXTRACTS

[75] Inventors: Yoshiro Kuroiwa; Eiichi Kokubo; Koichiro Aramaki; Hiroshi Uehara, all of Takasaki, Japan

[73] Assignee: Kirin Beer Kabushiki Kaisha, a/k/a Kirin Brewery Co., Ltd., Tokyo-to, Japan

[22] Filed: July 22, 1970

[21] Appl. No.: 57,298

[30] Foreign Application Priority Data
July 24, 1969 Japan.................................. 44/58556

[52] U.S. Cl. ............................. 99/50.5, 260/586 R
[51] Int. Cl................................................ C12c 9/02
[58] Field of Search.................... 99/50.5; 260/586 R

[56] References Cited
UNITED STATES PATENTS
978,476  12/1910  Nilson................................. 99/50.5
3,532,504  10/1970  Flesch................................. 99/50.5

Primary Examiner—Joseph M. Golian
Attorney—Holman and Stern

[57] ABSTRACT

To an aqueous alkali extract containing iso-$\alpha$-acids, prepared by subjecting hops to extraction of $\alpha$-acids therefrom and isomerization thereof in an aqueous alkali, an acid is added to adjust the pH value of the extract to a value of from 4.0 to 5.7 thereby to cause precipitation of coexisting impurity materials existing in dissolved state, whereas the iso-$\alpha$-acids remaining in dissolved state, and the resulting precipitate is removed, whereupon an isomerized hop extract of high iso-$\alpha$-acid utilization is produced without any harmful organic solvent.

6 Claims, No Drawings

PRODUCTION OF ISOMERIZED HOP EXTRACTS

BACKGROUND OF THE INVENTION

This invention relates generally to the art of utilizing hops for various uses and more particularly to a new and advanced technique for preparing an isomerized hop extract having two unique characteristics from an aqueous solution composed of various bitter substances derived from hops, mainly of iso-$\alpha$-acids produced by extracting $\alpha$-acids from hops and isomerizing them in an aqueous alkali.

In the preparation of an isomerized hop extract in accordance with the art known heretofore, difficulty has been encountered in reducing the art to practice in that increasing the purity of the iso-$\alpha$-acids within the extract has invariably given rise to a reduction in the utilization of the iso-$\alpha$-acids in the objective beverages into which addition is to be made, e.g., wort, fermenting wort, beer, and other beverages flavored with hops (hereinafter referred to as "malt beverage").

The term "hops" is herein used to designate hop cones and ground hops. The term "$\alpha$-acids" is herein used to designate humulone, cohumulone, adhumulone, prehumulone, and posthumulone, and the term "iso-$\alpha$-acids" is herein used to designate isomerized substances of these components.

By the conventional hopping technique in which natural hops or non-isomerized hop extracts are boiled in unhopped wort, the utilization of the $\alpha$-acids is very low, and from the standpoint of utilizing hops even more effectively, attempts have been and are being made to use so-called isomerized hop extracts. For the preparation of these hop extracts, the most widely used method is that wherein $\alpha$-acids are extracted with a certain organic solvent from hops, and, after removal by evaporation of the solvent, the $\alpha$-acids are isomerized in an aqueous alkali. At present, this method is being principally used in industrial processes.

On one hand, attempts have been made to heat hops directly in an aqueous alkali without carrying out a preliminary extraction of the $\alpha$-acids and thereby to carry out extraction of $\alpha$-acids and isomerization thereof in a single step. However, filtrate of the reaction product produced by this method (hereinafter referred to as "aqueous alkali extract") is merely a primary product obtained by subjecting hops to an extraction process with an aqueous alkaline solution, and within this extract, in addition to the objective iso-$\alpha$-acids, there is a large quantity of the undesirable substances such as polyphenols, pectins, nitrogenous compounds, their decomposition products, and the color substances giving a remarkably dark brown color (hereinafter referred to as "coexisting impurity materials").

Consequently, when the aqueous alkali extract itself is added in a large quantity directly to a malt beverage for the purpose of imparting a bitter taste, the coexisting impurity materials present in large quantity give rise to defects such as abnormal increase in the coloration, reduction in the colloidal stability, and imparting of off-flavor to the final product.

Other important points at the time of adding the aqueous alkali extract are that some of the coexisting impurity materials react with highly polymerized nitrogenous compounds within the malt beverage to form the precipitate, and that a major part of the coexisting impurity materials, which has been dissolved in the aqueous alkali, is transformed into an insoluble state due to the acidity of the malt beverage, whereby it precipitates out. During this process, full dissolution of the iso-$\alpha$-acids in the malt beverage is inhibited since the precipitate is formed while still containing a considerable quantity of iso-$\alpha$-acids.

Accordingly, one conceivable measure for removing impurity materials of this nature is to extract principally iso-$\alpha$-acids from the aqueous alkali extract with a certain organic solvent. However, because a rigid emulsion is formed between the aqueous alkali extract and the organic solvent at the time of liquid-liquid extraction, a very operation is required for complete recovery of the bitter substances. Furthermore, since isomerized hop extracts produced by this process assume the form of sticky hydrophobic resins, they assume a precipitated state when added to malt beverages and are hardly dissolved, and the utilization of the iso-$\alpha$-acids is very poor. A point which demands even greater attention and care is that an isomerized hop extract of this character prepared through the use of an organic solvent is added to the young beer in many cases, and that since no treatment whatsoever for removal of the solvent is carried out subsequent to the extract addition, any organic solvent remaining in the isomerized hop extract will remain in beer or hop-flavored beverage constituting the final product, giving rise to the possibility of harm to the human body. In fact, it is always possible to detect residual solvents in isomerized hop extracts produced by this method and sold on the market in a paste form.

In view of these considerations, the most important requirement is that isomerized hop extracts, even when used in the final stage of a brewing process, have no deleterious effect on the brewery product quality and, moreover, can be rendered into extracts in which the iso-$\alpha$-acids contained therein can be utilized with high effectiveness in the brewing process.

SUMMARY OF THE INVENTION

It is an object of the present invention to provide solutions to the above described problems encountered in the prior art and to provide a process for producing isomerized hop extracts which can be readily practiced on an industrial scale.

More specifically, an object of the present invention is to provide a process which comprises steps of subjecting hops to extraction of $\alpha$-acids therefrom and isomerization thereof in an aqueous alkali and subjecting the resulting aqueous iso-$\alpha$-acids solution to a purification step after the removal of hop residues, at the time of addition to the malt beverage, substances which inhibit dissolution of the iso-$\alpha$-acids are removed to most suitable state thereby to prepare a hop extract having high solubility in the malt beverage.

Another object of the invention is to provide a process for preparing hop extracts of the above stated character in which no organic solvent whatsoever is used, whereby there is absolutely no problem about the remainder of the solvent in the hop extracts thus produced.

According to the present invention, briefly summarized, there is provided a process of the above stated character which comprises the steps of heat processing hops in an aqueous alkali to recover $\alpha$-acids within the hops as iso-$\alpha$-acids in the aqueous alkali, adding an acid to the aqueous alkali extract thus obtained to adjust the pH of the solution to a value such that it is sufficient for precipitating coexisting impurity materials present in dissolved state, but the iso-α-acids remain dissolved, and obtaining the supernatant after the resulting precipitates are removed.

According to the present invention there are further provided isomerized hop extracts having high iso-α-acids utilization without any harmful substances.

The nature, details, and utility of the invention will be more clearly apparent from the following detailed description beginning with general considerations and concluding with specific examples of practice illustrating preferred embodiments of the invention.

DETAILED DESCRIPTION

The process of the invention can be practiced to produce isomerized hop extracts which are in a suitably purified state and have very high utilization of iso-α-acids in general by adding an acid, alone or combined, to an aqueous alkali extract to bring the pH value to from 4.0 to 5.7, preferably equivalent to that of a malt beverage, causing a large proportion of the coexisting impurity materials other than the iso-α-acids to precipitate as a sediment, and removing this sediment.

A most important feature of the isomerized hop extracts produced in accordance with the invention is that since these extracts are the product of taking into consideration the pH value of the malt beverage and selectively recovering and preparing only the water-soluble fraction at that pH value, the utilization of the iso-α-acids at the time of addition is high.

The present invention is based principally on the following findings and considerations.

Whereas the coexisting impurity materials other than iso-α-acids of the components contained in the aqueous alkali extract are extremely water insoluble on the acidic side, the objective iso-α-acids, in a pH region higher than approximately pH 3.5 corresponding to the pK value thereof, still retain their water solubility even in an acidic aqueous phase or aqueous acid. The water insolubility of these coexisting impurity materials become particularly pronounced in the pH region below a pH border of from 4.0 to 5.7. Accordingly, by merely adding an acid to the aqueous alkali extract exhibiting alkalinity to adjust the pH value of the aqueous phase to from 4.0 to 5.7, it is possible to remove most of the coexisting impurity materials, which cause difficulties during addition of the extract, from the aqueous alkali extract and, at the same time, to produce the preparation containing iso-α-acids having high solubility. Therefore, the matching of the pH value of the aqueous alkali extract by the addition of an acid to that of the malt beverage is advantageous for attaining a high utilization of the iso-α-acids.

However, it is not always necessary to adhere to this expediency. Provided that the pH value is greater than 4.0, the pH value may be set on the acidic side relative to the malt beverage since, then, the purity of the iso-α-acids can be increased even higher. In the case where this pH value is thus set below 4.0 to increase the purity of the iso-α-acids in the extract, the solubility of the iso-α-acids in the malt beverage becomes low, whereby such practices should be avoided.

The addition of an emulsifier in such a case to obtain an amply high solubility of the iso-α-acids has also been considered. However, from the standpoint of attaining a high degree of utilization of the iso-α-acids, it can be said that the process of the present invention whereby iso-α-acids having excellent utilization of the order of from 85 to 95 percent can be produced merely by an adjustment of the pH value of the aqueous alkali extract is the simplest and, moreover, is the most easily adaptable to industrial practice.

As the coexisting impurity materials precipitate as a result of the addition of acids, a portion of the iso-α-acids coprecipitated with the coexisting impurity materials is adsorbed on the surface of the precipitate of the coexisting impurity materials in some instances, thereby constituting a loss. In cases where this loss is unacceptable, the precipitate comprising the coexisting impurity materials is collected by separating means such as a centrifugal separator and then dissolved fully in water with a small quantity of an alkali. The acid is then added to set the pH value again in the desired range of from 4.0 to 5.7. By removing the precipitate then formed, a further thorough recovery of the iso-α-acids beomes possible. By repeating the same procedure as necessary, it is possible to recover quantitatively the iso-α-acids which have existed in the aqueous alkali extract.

Furthermore, since the aqueous alkali extract already exhibits alkalinity, it is also possible to prevent loss of iso-α-acids by dissolving the above mentioned precipitate comprising the coexisting impurity materials in the aqueous alkali extract itself, in place of dissolving them in water with a small quantity of an alkali, and thereafter carrying out addition of an acid and separation of precipitate. A supernatant thus obtained is almost completely free of coexisting impurity materials derived from hops, and already removed and can be added directly, as it is, to the malt beverage.

In cases where dilution due to the addition of a supernatant is not desirable, it can be added after concentration under conditions which effectively prevent the decomposition of the iso-α-acids obtained, or it can also be added after concentration and drying.

A powdery preparation obtained in the above described manner remains unchanged in quality even when it is stored in contact with atmospheric air.

The acids and alkalis used in the production of isomerized hop extracts according to the invention can be any organic or inorganic substances provided that the substances themselves or the salts formed during neutralization from the acids and alkalis are harmless to the human body. Examples of the most readily available alkalis are sodium hydroxide, sodium carbonate, and sodium bicarbonate, and those of readily available acids are various mineral acids, e.g., hydrochloric, sulfuric and nitric acids.

We have found that the isomerized hop extracts produced in accordance with the invention have the following practical advantage. Since each of these extracts comprises a collection of only substances which originally were in the form of solutions in the pH region of the corresponding malt beverage, the iso-α-acids contained therein have very high solubility in the malt beverage. Accordingly, when this extract is used in the production of beer or some other beverage flavoured with hops, the iso-α-acids can be transferred into the product beverage much more efficiently than in the case where a conventional isomerized hop extract sold on the market is used.

In an actual instance of comparison, an isomerized hop extract in powder form prepared in accordance with the invention and four kind of isomerized hop extracts sold on the market were added to a young beer, whereupon samples were then stored for 20 days, filtered, and bottled, and the proportions of the iso-α-acid which had been transferred into these finished beers thus obtained were determined and found to be as indicated in the following table. These results in the table, which are in terms of utilization (%) of the iso-α-acids, indicate the remarkably high utilization of the iso-α-acids in the isomerized hop extract prepared according to the invention.

| Isomerized Hop Extract | Utilization of Iso-α-Acids in Extract (%) |
|---|---|
| Hop Extract A (pasty), sold on the market | 58.0 |
| Hop Extract B (powdery), sold on the market | 74.9 |
| Hop Extract C* (semi-liquid), sold on the market | 47.3 |
| Hop Extract D* (liquid), sold on the market | 81.6 |
| Hop Extract of the Invention (powdery) | 91.5 |

* Emulsifier added

We have found that a further advantage of isomerized hop extracts of the invention is that, when they are used in the brewing of beer, it becomes possible to decrease also the dissolution of polyphenols derived from the hops into the beer to a greater extent than in the conventional hopping methods, whereby the colloidal stability is increased.

Furthermore, by collecting the steam vaporized during heating of hops in the practice of the invention, essential oils can be obtained separately from the hops. The essential oils thus obtained can be fractionally distilled in accordance with necessity and added to a copper or fermenting cellar or added to malt beverage to impart a hoppy aroma thereto.

In order to indicate still more fully the nature and utility of the invention, the following examples of practice constituting preferred embodiments of the invention and results are set forth, it being understood that these examples are presented as illustrative only and that they are not intended to limit the scope of the invention.

EXAMPLE 1

100 liters of a 0.05-normal (N) aqueous solution of sodium carbonate was heated to boiling, and after 1 kg. of ground hops was added thereto, the boiling of the batch was continued for 30 minutes. Next the batch was cooled rapidly to room temperature and then subjected to straining under pressure to separate out a residue of hops, whereupon 97 liters of an aqueous alkali extract (containing 49 grams (g.) of iso-α-acids, the content of the iso-α-acids within the solids being 12.7 percent) was obtained.

A 1-N solution of hydrochloric acid was added to this aqueous alkali extract as it was stirred until the pH value became 5.2. The solids formed by the addition of the acid were separated out by centrifugal separation (1,300 × g, 5 minutes), whereupon 95 litres of a purified aqueous alkali extract (containing 36.5 g. of iso-α-acids, the content of which was 28.5 percent) was obtained.

This purified extract was concentrated at 60° C to a water content of approximately 80 percent and then subjected to freeze-drying, whereupon 132 g. of a powdery hop extract (including 34.0g. of iso-α-acids) was obtained. This powdery extract was added to 40 HL. of a fermenting wort (pH 5.3, iso-α-acid content 20.0 ppm.) and the resulting process materials were subjected to an ordinary beer brewing process. The iso-α-acid content of the finished beer thus produced was 27.6 ppm. The utilization of the iso-α-acids added was 90.3 percent.

EXAMPLE 2

50 liters of a 0.05-normal solution of sodium hydroxide was heated to boiling, and after 1 kg. of ground hops was added thereto, the boiling of the batch was continued for 30 minutes. Thereafter, the batch was subjected to the procedure set forth in Example 1, whereupon 48 liters of an aqueous alkali extract (containing 44 g. of iso-α-acids, the content of which in the solids was 13.0 percent) was obtained.

A 1-normal solution of hydrochloric acid was added to this extract as it was stirred until the pH value thereof became 4.5. This solution was subjected to centrifugal separation (1,300 × g., 5 minutes), whereupon a supernatant liquid A and a precipitate A were obtained. The precipitate A was suspended in 25 liters of water, to which a 5-normal solution of sodium hydroxide was added to bring the pH value of the solution to 9.0, to dissolve the precipitate A, a 1-normal solution of hydrochloric acid was added thereto to return the pH value to 4.5. The resulting batch was subjected to centrifugal separation (1,300 × G., 5 minutes), whereupon a supernatant liquid B and a precipitate B were obtained.

The supernatant liquids A and B obtained in the above described manner were combined, whereupon 71 liters of a purified aqueous alkali extract (containing 41.5 g. of iso-α-acids, the content of which in the solids was 22.3 percent) was obtained. This extract liquid was concentrated at 60° C and under reduced pressure, whereupon 4.3 kg. of a mushy isomerized hop extract (including 40.0 g. of iso-α-acids) was obtained.

This hop extract was added to 30 HL. of young beer (brewed with one half the quantity of hops ordinarily used, iso-α-acid content being 15.0 ppm.) and the storage was continued for a further 20 days. The resulting product beer was found to contain 27.3 ppm. of iso-α-acids. The utilization of the added iso-α-acids in the beer was 92.2 percent.

EXAMPLE 3

By the process set forth in Example 1, 130 g. of a powdery isomerized hop-extract (containing 34.1 g. of iso-α-acids) was obtained. The steam vaporized during boiling of hops was cooled in a condenser, and 7.5 g. of essential oils of hops separated in the upper layers of the resulting condensed liquor were obtained.

Separately, 6 g. of the above mentioned essential oils were added to 500 liters of unhopped wort, which was then boiled for 90 minutes. 0.5 g. of the essential oils were added to the batch 15 minutes before the termination of the boiling. The wort thus prepared was caused to ferment, whereupon 452 liters of a young beer was obtained.

To this young beer, 54 g. of the hop extract powder was added, and the resulting batch was stored for a further two weeks. As a result, 422 liters of the finished beer was obtained and found to have an iso-α-acid content of 28.9 ppm. The utilization of the added iso-α-acids in the beer was 91.5 percent.

We claim:

1. In a process for producing isomerized hop extracts comprising heat processing hops in an aqueous alkali to recover α-acids within the hops as iso-α-acids in the aqueous alkali and adding an acid to the aqueous alkaline solution thus obtained containing the iso-α-acids as well as contaminants, an improvement which comprises adjusting the pH value of said solution to a pH value in the range of from 4.0 to 5.7 thereby to precipitate the contaminants while maintaining the iso-α-acids in solution and recovering an aqueous solution which contains the iso-α-acids dissolved therein and which is free of the precipitate.

2. A process for producing isomerized hop extracts as set forth in claim 1 including a step of dissolving said precipitate once in an aqueous alkali of a concentration which is sufficient to cause the precipitate to dissolve and again adding an acid to adjust the pH value of the resulting solution to a pH value in the range of from 4.0 to 5.7 thereby to precipitate the contaminants while maintaining the iso-α-acids in solution and recovering an aqueous solution which contains the iso-α-acids dissolved therein and which is free of the precipitate.

3. A process for producing isomerized hop extracts as set forth in claim 1 in which said pH value is in the range of from 4.0 to the pH value of a malt beverage to which the isomerized hop extract thus produced is to be added.

4. A process for producing isomerized hop extracts as set forth in claim 2 in which said pH value is in the range of from 4.0 to the pH value of a malt beverage to which the isomerized hop extract thus produced is to be added.

5. A process for producing isomerized hop extracts as set forth in claim 2 in which said aqueous alkali solution of the iso-α-acid obtained is used for said aqueous alkali in the process step of dissolving said precipitate once in an aqueous alkali.

6. A process for producing isomerized hop extracts as set forth in claim 1 in which a supernatant resulting after removal of the precipitate of the contaminants from the aqueous alkali extract obtained is concentrated or dried under conditions that will effectively prevent decomposition of iso-α-acids contained in the supernatant.

* * * * *